United States Patent [19]

Sejournant

[11] 4,349,586
[45] Sep. 14, 1982

[54] ANTI-ADHESIVE COMPOSITION BASED ON WAX IN ORGANIC SOLVENT MEDIUM

[75] Inventor: Francine Sejournant, Vitry-sur-Seine, France

[73] Assignee: Antipol Commercial Systems (Jersey) Limited, St. Helier, Channel Islands

[21] Appl. No.: 107,607

[22] Filed: Dec. 27, 1979

[30] Foreign Application Priority Data

Dec. 28, 1978 [FR] France .................................. 78 36768

[51] Int. Cl.³ .......................... B05D 5/08; B05D 1/36
[52] U.S. Cl. ........................................ 427/154; 106/2; 427/155; 427/156; 427/407.1; 427/409; 427/416
[58] Field of Search ............... 427/387, 154, 155, 156, 427/407.1, 409, 416; 106/2, 8, 10, 271, 6; 252/382, 383

[56] References Cited

U.S. PATENT DOCUMENTS

| | | | |
|---|---|---|---|
| 2,614,049 | 10/1952 | Swanson | 106/10 |
| 3,393,078 | 7/1968 | Lockhart et al. | 106/8 |
| 3,395,028 | 7/1968 | Mackles | 106/10 X |
| 3,785,841 | 1/1974 | Beard | 106/186 |
| 3,847,622 | 11/1974 | Brandl et al. | 106/10 |
| 4,013,475 | 3/1977 | Liebowitz et al. | 106/10 |

FOREIGN PATENT DOCUMENTS 681877 10/1952 United Kingdom .

*Primary Examiner*—John D. Smith
*Assistant Examiner*—Thurman K. Page
*Attorney, Agent, or Firm*—Fleit & Jacobson

[57] ABSTRACT

The invention involves anti-adhesive compositions. This composition is basically characterized by the fact that it contains, in an organic solvent, at-least one microcrystalline wax having a melting point of between 40° and 150° C., which may be combined, if necessary, with a paraffin wax, a silicone oil or various swelling agents.

This composition makes it possible to form a protective coating for walls against bill-posting, penetration and attachment of graffiti and/or paint and against adherence of dust and miscellaneous polluting agents in and on such surfaces.

1 Claim, No Drawings

ANTI-ADHESIVE COMPOSITION BASED ON WAX IN ORGANIC SOLVENT MEDIUM

This invention regards an anti-adhesive product designed to form a protective coating on walls against bill-posting, penetration and attachment of graffiti and/or paint and against adherence by dust and various polluting agents in and on such substrates.

Anti-adhesives have already been proposed with the aim of protecting walls from unauthorized bill-posting. These compositions contain, only silicone oil, along with a swelling agent and a solvent.

The compositions of the previous state of the art have the drawback, however, of drying out very quickly and thus losing their anti-adhesive ability. Moreover, when they are applied to substrates like walls they tend to be sticky and pick up dust and change the surface colour, and hence detract from the appearance of the walls on which they are applied.

Finally, the prior art compositions have the drawback of high cost and of being difficult to store, and their effective lifetime is limited.

The applicant has now discovered a new wax-based anti-adhesive composition which does not have the above-mentioned shortcomings. This composition in fact makes it possible to obtain a uniform thin film on the walls being coated which possesses anti-adhesive properties with respect to posters, adhesive labels and various glues and paints, as well as to dust and any other contaminant.

This composition makes it possible to obtain a film which is self-washable by rainwater or hosing and has the advantage or possessing good sliding qualities and therefore a good coefficient of friction.

The compositions according to the invention enable a protective film to be formed which prevents water and damp from passing through and which can therefore be used an an anti-corrosion (on metals, paintwork, etc.) and water-repellent (walls, concrete, stone, brickwork, etc.) protective film.

It is also possible through the invention to prevent dirty spots ("moustaches") building up on building facades since the dust cannot pass through and attach itself to the protective film.

The composition according to the invention possesses excellent stability with time and leaves no marks on the wall which bears this coating; it also has an improved effective life ranging from 2 to 10 years depending on the application.

The object of this invention is therefore an anti-adhesive composition.

Another object of this invention consists of a process for preparing such a composition.

Finally, an object of the invention is a surface treatment method applying the above-defined composition.

Other objects of the invention will result from reading the description and the examples which follow.

The anti-adhesive composition according to the invention is basically characterized by the fact that it contains, within an organic solvent medium, at least one microcrystalline wax with a melting point lying between approximately 40° and 150° C. and silicone oil.

The microcrystalline waxes which are more particularly favoured are those possessing a melting point of 58°-60° C., used, if necessary, in mixture with microcrystalline waxes with higher melting points.

This composition may contain, in addition to the above-mentioned microcrystalline waxes and silicone oil other waxes, and preferably, at least one mineral wax selected from amongst the oxyethylenated and/or ester waxes having a melting point lying between 40° and 110° C., like, preferably, a paraffin wax, and notably a paraffin wax called Petrolatum or white paraffin.

Application of a combination of the above-mentioned type of microcrystalline waxes and paraffin wax makes it possible to improve the anti-adhesive properties of walls thus coated.

The wax and/or waxes which can be used in combination with the above-mentioned microcrystalline wax are preferably present in proportions of between 0.05 and 80% by weight compared to the weight of the first wax mentioned above.

The waxes are present in particular in the composition according to the invention in proportions lying between 4 and 80% by weight compared with the total weight of the composition, and preferably between 4 and 65% by weight and particularly between 10 and 30% by weight.

The organic solvents which can be used more particularly according to the invention are wax solvents and special mention can be made of halogenated hydrocarbon derivatives, benzene, toluene and white spirit.

In a preferred embodiment of the invention white spirit is used, in particular with less than 5% of aromatics, or else a trichloro-1,1,1 ethane sold under the name of "Baltane" by the RHONE-POULENCE Company.

The solvent or solvent mixture is present, preferably, in proportions of between 20 and 96% and preferably between 70 and 90% by weight compared with the total weight of the composition.

It is of course clear that, without leaving the framework of this present invention, any other compound or substance can be added which enables the required anti-adhesive effect to be obtained or which enables additional properties to be given to the product, for example: gloss, etc.

The silicone oil is preferably present in proportions of between 0.01 and 15% and preferably between 0.1 and 5% by weight compared with the total weight of the composition.

This silicone oil or/and grease must preferably be miscible with the above-mentioned solvents which form the basis of the compositions according to the invention.

Amongst the silicone oils which can be used according to the invention we can mention methylpolysiloxane having a viscosity of between 500 and 2,500,000 cs or methyl phenylpolysiloxane possessing a viscosity of between 10 and 100,000 cs or their mixture.

The viscosity of the silicone oil used according to invention is preferably comprised between 500 and 100,000. cs.

In another embodiment of the invention a swelling agent can be used in combination with the above-mentioned wax or waxes, such as a tallow-based fatty acid in the form of an aluminum soap (aluminium stearate), this swelling agent being present in proportions of between 0.01 and 10% by weight compared with the total weight of the composition and preferably between 0.01 and 2% by weight.

It is also possible to add to the above-defined composition a calcium-based metal soap to the extent of 0.01 to 10% and preferably of 0.05 to 3% by weight compared with the total weight of the composition.

It goes without saying that the proportions indicated are those of the composition intended to be directly applied to the surface to be treated.

Because of this it can be prepared by dilution before being applied from a concentrated composition. The concentrated compositions have a concentration which is 4 to 9 times higher than the concentrations indicated above.

The process of preparing compositions according to the invention, which forms an object of the invention, is basically characterized by the fact that the wax or waxes are melted, with agitation, in the same weight of solvent, at a temperature which is greater by 3° to 20° C. and preferably by 8° to 10° C. than the melting point of the wax with the highest melting point. Heating is always stopped while agitation is continuing, and the rest of the solvent containing the silicone oil is incorporated at ambient temperature so as to form a good dispersion and the mixture is left to cool slowly whilst being agitated.

The surface treatment process, an object of the invention, consists in applying the composition as defined above onto the substrates to be treated by means of the usual coating equipment, such as brush or spray gun.

It is observed that, after treatment, posters applied on such a surface do not adhere, or at least come off easily. Generally they slide off by themselves.

Graffiti or paint applied on such a surface does not adhere and can be removed by brushing.

The composition according to the invention also has the advantage that it can be destroyed by means of a paint stripper or jet of hot water under pressure at a temperature which exceeds the melting point of the wax with the highest melting point; this may be useful in certain cases, particularly when it is wished to coat the substrate with another coating or paint.

In any case in which a mixture of silicone oils is part of the composition it suffices, in order to remove graffiti, to rub or destroy the protective film using a solvent of the type mentioned above for manufacture, or by means of a chlorinated solvent like, for example, methylene chloride.

The above-defined process, particularly when it is applied to porous substrates, may be preceded by a stage in which the surface to be treated is coated with a self-emulsifying wax-based aqueous composition possessing a melting point of between 45° and 110° C. These waxes are chosen in particular from the oxidized mineral waxes or ester waxes made emulsible by means of an anionic, cationic or non-ionic surface active agent, with the synthetic waxes of vegetable origin possessing a melting point of between 45° and 110° C. combined with a non-ionic emulsifying agent, amongst which we can mention waxes with a melting point of 70° to 78° C. and mineral waxes with a melting point lying between 40° and 65° C. such as Petrolatum or White Paraffin type paraffin waxes.

A microcrystalline wax with a melting point of between 48° and 110° C. and preferably a microcrystalline wax of the above-defined type can also be applied by means of this first aqueous composition.

The synthetic wax of vegetable origin is present in proportions of preferably between 0.5 and 12% by weight compared to the total weight of this first composition, whilst the mineral waxes and/or microcrystalline wax are present in proportions lying between 0.05 and 40% by weight compared with the weight of the synthetic wax of vegetable origin.

The non-ionic emulsifying agents are preferably chosen from amongst the lower molecular weight oxyethylenated alkylphenols or alcohols. When anionic surface active agents are present these are preferably chosen from the soaps derived from natural or synthetic fatty acid.

This process has the advantage of giving anti-adhesive properties to highly porous substrates and the combination of these two types of coat at substrate level provides them with improved anti-adhesive properties.

The following examples are designed to illustrate the invention without, however, being limitative in nature.

EXAMPLE I

|  | percent weight |
|---|---|
| Microcrystalline wax with melting point of 58 - 60° C. sold under the name of 23-60 by the TISCCO Company | 18% |
| Silicone oil (methylpolysiloxane) sold under the name of 47 V 5000 by the RHONE POULENC Company | 3% |
| White spirit to make up to | 100% |

EXAMPLE II

The following example is intended to illustrate a version of the invention which uses a swelling agent.

| Above-mentioned microcrystalline wax | 40% |
|---|---|
| Paraffin wax (white paraffin) sold under the name of PA/BL by the R.F.O. Company (Melting point 55° C.) | 20% |
| silicone oil (methylphenylpolysiloxane) sold under the name Rhodorsil huile 710 by Rhone Poulenc (viscosity 500 cs) | 5% |
| Aluminium stearate | 1% |
| White spirit to make up | 100% |

Dust on the surface is easily removed by brushing thus avoiding blast-cleaning of the facade.

Moreover the film thus formed could be removed by application of a hot water jet at about 75° C., which makes it possible to avoid setting up scaffolding and costly plant for cleaning the wall.

EXAMPLE III

|  | % weight |
|---|---|
| Silicone oil sold under the name 47 V 100,000 by Rhone Poulenc | 4% |
| Silicone oil sold under the name 47 V 10,000 by Rhone Poulenc | 7% |
| Silicone oil sold under the name Rhodorsil huile 710 by Rhone Poulenc | 2% |
| Above-mentioned microcristalline wax | 10% |
| Microcrystalline wax (melting point 104° C.) sold under the name of SP2 bt the TISCCO Cy | 4% |
| White spirit to make up to | 100% |

The coating thus obtained possesses better resistance when it is applied on facades exposed to the sun's heat in hot countries.

EXAMPLE IV

In a first stage the following composition is applied:

Synthetic wax derived from vegetable wax (melting

| -continued | |
|---|---|
| point 75° C.°) sold under the name of Cire OFR by the R.F.O. Company | 2.4 |
| Mineral wax called white paraffine sold under the name PA/BL by the TISCCO Company (melting point about 55° C.) | 0.6 |
| Microcrystalline wax with a melting point of 58-60° C. sold under the name of 23-60 by the TISCCO Company | 0.6 |
| Water to make up to | 100% |

This composition was prepared by introducing the three above-mentioned waxes into the same weight of water and raising the temperature of the whole to about 78° C. with stirring. The perfectly uniform mixture thus obtained is then dispersed with agitation of the mixture in cold water (20° C.) by means of a blender.

After drying, the composition from example I is applied to the surface thus pre-treated.

It is observed that a substrate is formed which is smooth and possesses good anti-adhesive properties with respect to posters.

Similar results are recorded when the second composition applied is the composition from example III quoted above.

I claim:

1. Surface treatment process for forming a protective coating against bill-posting, penetration and attachment of graffiti and/or paint, and against the adherence of dust and polluting agents in which the substrate is treated by means of an aqueous composition containing at least one synthetic wax of vegetable origin, one microcrystalline wax, or a mixture thereof having a melting point of between 45° and 110° C., followed by applying an anti-adhesive composition containing within an organic solvent without water at least one microcrystalline wax present in an amount of 10 to 30% by weight compared with the total weight of the composition and a silicone oil which is a methylpolysiloxane having a viscosity of 500 to 2,500,000 cs, a methylphenylpolysiloxane with a viscosity of between 10 and 100,000 cs or a mixture thereof present in an amount of 0.01 to 15% by weight compared with the total weight of the anti-adhesive composition.

* * * * *